UNITED STATES PATENT OFFICE.

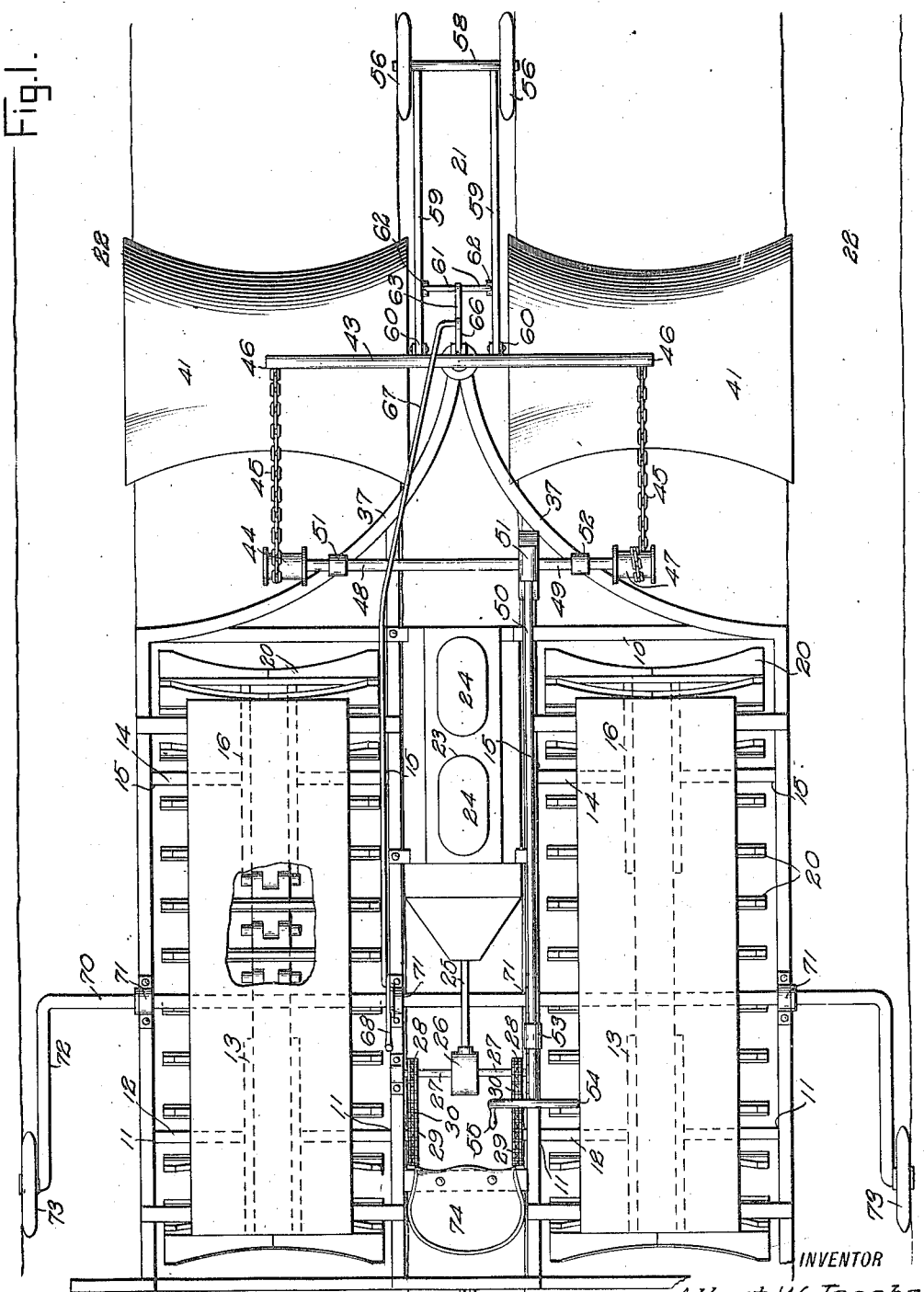

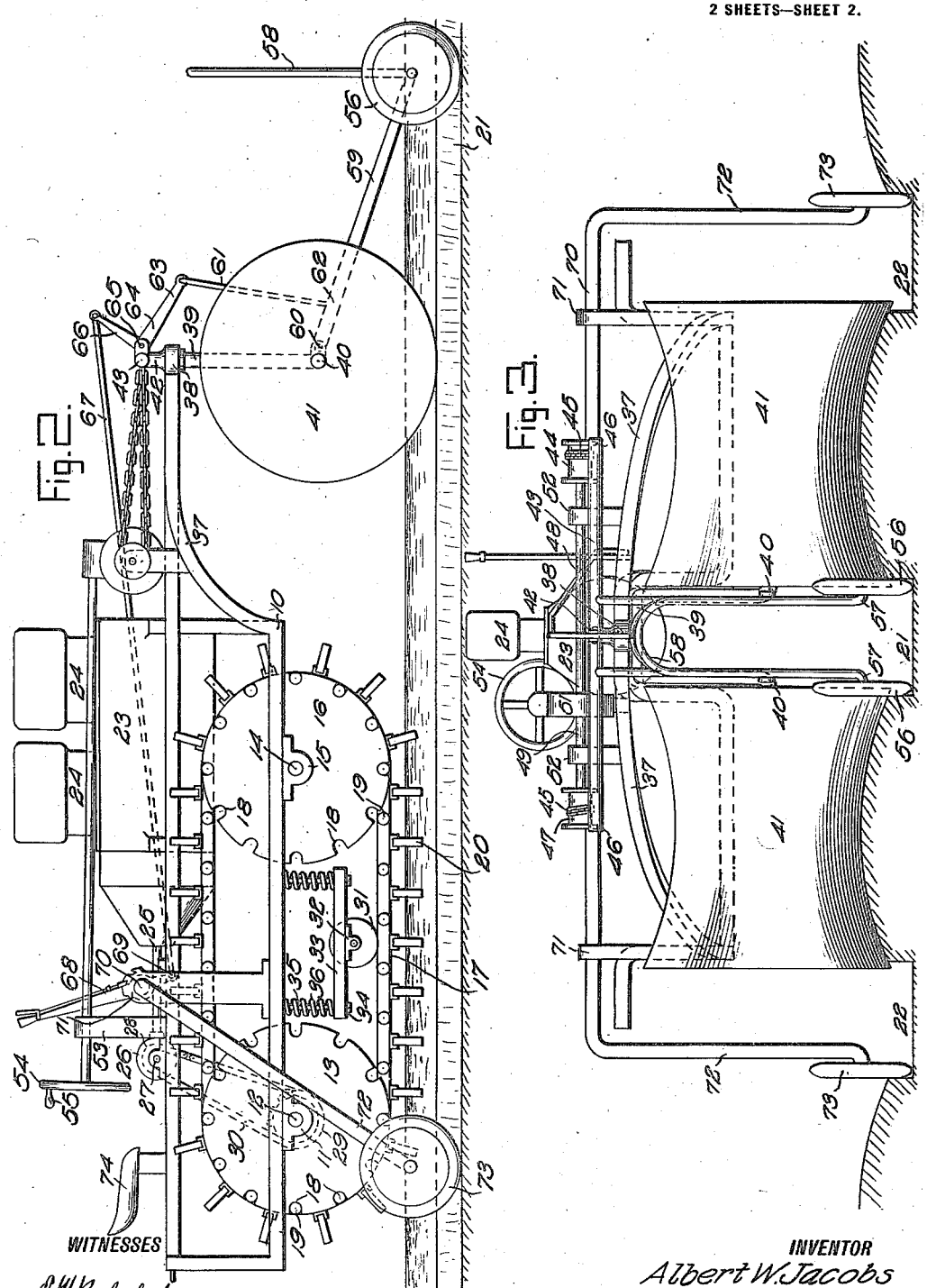

ALBERT WILLIAM JACOBS, OF YUTAN, NEBRASKA.

TRACTOR.

1,221,739.  Specification of Letters Patent.  Patented Apr. 3, 1917.

Application filed August 4, 1915. Serial No. 43,548.

*To all whom it may concern:*

Be it known that I, ALBERT W. JACOBS, a citizen of the United States, and a resident of Yutan, in the county of Saunders and State of Nebraska, have invented a new and Improved Tractor, of which the following is a full, clear, and exact description.

My invention has for its object to provide a tractor which is particularly well adapted for use on large corn fields, the tractor being so constructed that it may be used not only for drawing planters across the fields but it also may be used to advantage for drawing cultivators without injury to the growing corn.

While the tractor may be steered when desired, it is ordinarily unnecessary for the operator to manipulate the steering mechanism for the tractor is provided with guide-wheels for traveling in furrows, it being possible to raise these guide wheels when the operator wishes to turn the tractor at the end of a field.

The tractor is driven by endless chains which carry projecting ribs which engage the ground.

Still other objects of the invention will appear in the following specification in which the preferred form of the invention is disclosed.

In the drawings similar reference characters refer to similar parts in all the views in which, Figure 1 is a plan view of my tractor, parts being broken away to show the construction;

Fig. 2 is a side elevation of Fig. 1; and

Fig. 3 is a front elevation of the tractor.

By referring to the drawings it will be seen that a frame 10 is provided which has bearings 11, in which shafts 12 are journaled, these shafts 12 being disposed side by side and being spaced apart as will be seen by referring to Fig. 1 of the drawings. Secured to each of the shafts 12 there is a drum 13. Disposed in front of the shafts 12, there are additional shafts 14 which are journaled in bearings 15 in the frame, there being two drums 16, one mounted on each of the shafts 14, the said drums 16 being disposed in alinement with the drums 13 so that belts 17 may be used for connecting the drums 13 and 16, there being two of the said belts 17, which I dispose around the drums as illustrated in the drawings.

In the periphery of the drums 16 there are openings 18 for receiving the studs 19 on the belts 17 with the rotation of the drums, this means being provided to prevent any lost motion between the drums 13 and 16 and the belts 17. Secured to the belts 17 there are ribs 20, which are provided for engaging the ground so that with the rotation of the drums the belts will move the said ribs 20 into engagement with the ground and rearwardly of the frame 10, thereby moving the frame forwardly. The ribs 20 are preferably constructed in two sections as illustrated in Fig. 1 of the drawings, these sections being bolted to the belts 17, the sections having their outer surfaces concave transversely of the machine. The ribs are sufficiently long to substantially cover the ground between two furrows, the ribs on one of the belts being spaced from the ribs on the companion belt substantially the width of an intervening furrow. In the drawings this intervening furrow is referred to by the reference character 21, the furrows at the sides of this intervening furrow being indicated by the reference character 22.

Mounted on the frame 10 there is an engine 23, having cylinders 24, the shaft 25 being rotated by the engine in the usual manner, this shaft leading to the differential 26, which is connected with the shafts 27 to rotate the latter, sprocket wheels 28 being secured to the shafts and being connected with the sprocket wheels 29 on the shafts 12 by sprocket chains 30. The belts 17 will, of course, be driven when the shafts 12 are rotated by the manner set forth, these belts 17 being held yielding in position between the drums 13 and 16 by the rollers 31, journaled in bearings 32 on the cars 33, which have openings 34, through which the bolts 35 extend, said bolts 35 being secured to the frame 10. Springs 36 are coiled on the bolts 35 and abut against the frame 10 and against the cars 33 to hold the said cars 33 yielding down.

The body of the frame is supported by the belts 17 and the ribs 20, and as the frame is moved forwardly, the corn growing in the furrow 21 will not be injured by the tractor as the corn will be disposed between the drums and belts and under the frame and the engine 23. The sides of the frame 10 are curved upwardly and forwardly at 37, and at their forward ends they are provided with a bearing 38, in which is journaled the inverted U-shape axle 39 having the laterally extending axles 40, on which the spools 41 are mounted, the said spools being spaced apart so that they will extend from the furrow 21 which is between the spools substantially to the furrows 22. The outer surfaces of these spools are concave transversely as indicated in Figs. 1 and 3 of the drawings so that they will travel on the ground between the furrows without pressing the earth into the furrows. The journal on the axle 39 journaled in the bearing 38 extends above the said bearing at 42 and is secured to the transverse bar 43, this transverse bar 43 being connected with the drums 44 and 47 by chains 45, a chain 45 being secured to each end 46 of the transverse bar 43, the said drums 44 being secured to a shaft 48 and the drum 47 being secured to a shaft 49, these shafts 48 and 49 being operated by the longitudinally extending shaft 50 by means of the usual gearing contained in the gear box 51. One of the chains 45 is wound over and down on the drum 44, and the other chain 45 is wound under and up on the drum 47, so that when the shafts 48 and 49 are rotated in one direction, one of the chains will be wound on its drum, and when the shafts 48 and 49 are rotated in the opposite direction, the other chain 45 will be wound on its drum. The shaft 48 is journaled in a bearing 51 and the shaft 49 is journaled in a bearing 52, these bearings 51 and 52 being mounted on the portions 37 of the frame. The shaft 50 is journaled in a bearing 53 and it may be rotated by means of the wheel 54, provided with a handle 55.

It will be understood that when the tractor is driven it may be steered by the means which have been described for rocking the axles 40 and the spools 41 on a vertical axis, but ordinarily it is not necessary for the operator to give the steering mechanism any attention for when the tractor has been disposed in proper position relatively to the furrows 21 and 22, the guide wheels which I will now describe will keep the tractor in proper position as it travels over the ground. Two sets of guide wheels are provided, the forward set of guide wheels being indicated in the drawings by the reference character 56, these guide wheels being mounted on outwardly bent terminals 57 of an inverted U-shaped axle 58, this axle being constructed in this shape so that it will not interfere with the corn which may be growing in the furrow 21. To the axle 58 at its terminals 57, there are secured links 59, these links 59 being pivoted at 60 to the terminals 40 of the axle 39. It will therefore be seen that when the guide wheels 56 travel in the furrow 21, they will serve to prevent the movement of the spools 41 out of alinement, but when it is desired to turn the tractor, these guide wheels 56 must be raised as will be readily understood, and to accomplish this I pivot links 61 to the links 59 at 62, these links 61 being also articulated to the arm 63 of a bellcrank lever 64 pivoted at 65 to the projecting journal 42, the other arm 66 of the said bellcrank lever being connected by a link 67 with a lever 68 at 69. This lever 68 is secured to a shaft 70 which is journaled in bearings 71, and which projects outwardly a considerable distance at both sides of the tractor, arms 72 being secured to the ends of the shaft 70, said arms extending downwardly and rearwardly therefrom for carrying the guide wheels 73, these guide wheels being provided for traveling in the furrows 22 at the sides of the furrow 21. It will be understood that the lever 68 may be operated to draw rearwardly the link 67, thereby raising the arms 69 by means of the bellcrank lever 64, and the links 61, and at the same time this movement of the lever 68 will serve to rock the shaft 70, thereby raising the arms 72, and that when this is done, not only will the guide wheels 56 be raised from the furrow 21, but the guide wheels 73 will be raised from the furrows 22. A seat 74 is mounted on the frame 10 for the operator.

Having thus described my invention I claim as new, and desire to secure by Letters Patent:—

1. In a tractor, a frame, two drums rotatably mounted on the frame one in front of the other, there being openings in the sides of the drums at their peripheries, a belt disposed around the drums and having two rows of studs spaced apart and extending laterally for seating themselves in the openings with the rotation of the drums, and means to rotate one of the drums.

2. In a tractor, a frame, two drums disposed side by side and spaced apart, means disposed around the drums and having their outer edges curved transversely to engage the ground to move the frame forward, two spools disposed in alinement with the drums and spaced apart substantially the same distance as the drums are spaced apart, the outer surfaces of the spools being arched transversely an axle on which the spools are mounted, the axle being pivoted to the frame on a vertical axis, and means for rotating the axle.

3. In a tractor, a frame, two drums rotatably mounted on the frame one in front of the other, there being openings in the sides of the drums at their peripheries, a belt disposed around the drums and having two rows of studs spaced apart for seating themselves in the openings with the rotation of the drums, means to rotate one of the drums, a car disposed between the drums and having a roller for pressing downwardly against the belt, and resilient means for holding the car down relatively to the frame.

4. In a tractor, a frame having sides converging upwardly and forwardly, two drums spaced apart one at each side of the body of the frame and journaled in bearings therein, an inverted U-shaped axle for spanning a furrow and having outwardly bent terminals, and two spools one mounted on each terminal, the axle being pivoted for rotating on a vertical axis at the front of the frame.

In testimony whereof I have signed my name to this specification in the presence of two subscribing witnesses.

ALBERT WILLIAM JACOBS.

Witnesses:
  PAUL E. KOERBER,
  HARRY C. PARMENTER.